United States Patent
Englund et al.

(10) Patent No.: US 8,442,548 B2
(45) Date of Patent: *May 14, 2013

(54) ADJUSTMENTS OF IUB LOAD MEASUREMENTS

(75) Inventors: Eva Englund, Linköping (SE); Erik Geijer Lundin, Stockholm (SE); Fredrik Gunnarsson, Linköping (SE); Ke Wang Helmersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,708

(22) Filed: Jun. 5, 2012

(65) Prior Publication Data

US 2012/0243423 A1 Sep. 27, 2012

Related U.S. Application Data

(63) Continuation of application No. 12/525,801, filed as application No. PCT/SE2008/050129 on Feb. 1, 2008.

(30) Foreign Application Priority Data

Feb. 5, 2007 (SE) .................................. 0700289-2

(51) Int. Cl.
*H04Q 7/20* (2006.01)
(52) U.S. Cl.
USPC ........... 455/453; 455/423; 455/560; 455/522; 455/450
(58) Field of Classification Search ............... 455/423.1, 455/560, 522, 450; 370/252, 326
See application file for complete search history.

(56) References Cited

U.S. PATENT DOCUMENTS

| | | | | |
|---|---|---|---|---|
| 7,616,596 | B2 * | 11/2009 | Lee et al. | 370/326 |
| 7,746,840 | B2 * | 6/2010 | Lee | 370/348 |
| 7,983,687 | B2 * | 7/2011 | Englund et al. | 455/450 |
| 8,045,527 | B2 * | 10/2011 | Fan et al. | 370/332 |
| 2004/0147276 | A1 * | 7/2004 | Gholmieh et al. | 455/522 |
| 2004/0223455 | A1 * | 11/2004 | Fong et al. | 370/229 |
| 2005/0043062 | A1 * | 2/2005 | Ahn et al. | 455/560 |
| 2005/0059421 | A1 * | 3/2005 | Reed et al. | 455/522 |
| 2006/0215608 | A1 | 9/2006 | Lee et al. | |
| 2006/0229089 | A1 | 10/2006 | Tokgoz et al. | |
| 2008/0175185 | A1 * | 7/2008 | Ji et al. | 370/318 |
| 2008/0254819 | A1 * | 10/2008 | Niwano et al. | 455/522 |
| 2008/0279121 | A1 * | 11/2008 | Englund et al. | 370/278 |
| 2009/0088185 | A1 * | 4/2009 | Beale | 455/458 |
| 2009/0103511 | A1 * | 4/2009 | Marinier et al. | 370/345 |
| 2010/0067389 | A1 * | 3/2010 | Wang Helmersson et al. | 370/252 |

OTHER PUBLICATIONS

3RD Generation Partnership Project. "HSUPA RRM Conceptual Aspects and Signalling Needs." 3GPP TSG-RAN WG2, Tdoc R2-050436, Scottsdale, US, Feb. 14-18, 2005.

3RD Generation Partnership Project. "Measurements and RRM for E-DCH." 3GPP TSG RAN WG2, R2-050865, Beijing, China, Apr. 4-8, 2005.

* cited by examiner

*Primary Examiner* — Charles Shedrick
(74) *Attorney, Agent, or Firm* — Coats & Bennett, P.L.L.C.

(57) ABSTRACT

A method may include determining whether a discrepancy exists between scheduling headroom computable by a first device and scheduling headroom computable by a second device, determining one or more load measurements that the second device bases its computation of the scheduling headroom if it is determined that the discrepancy exists, modifying the one or more load measurements, and calculating the scheduling headroom based on the modified one or more load measurements.

19 Claims, 8 Drawing Sheets

ADJUSTMENTS OF IUB LOAD MEASUREMENTS

RELATED APPLICATIONS

This application is a continuation of U.S. patent application Ser. No. 12/525,801, which is a national stage application of PCT/SE2008/050129, filed Feb. 1, 2008, which claims benefit of SE 0700289-2 filed Feb. 5, 2007, the disclosures of each of which are incorporated herein by reference in their entirety.

TECHNICAL FIELD

The concepts described herein may relate to methods and arrangements in a network. In particular, the concepts described herein may relate to methods and arrangements for providing load measurements and resource management in a network.

BACKGROUND

Under the Third Generation Partnership Project (3GPP) release 99 framework, a radio network controller (RNC) may control resources and user mobility. Resource control may include admission control, congestion control, and channel type switching. Uplink data may be allocated to an Enhanced Dedicated Channel (E-DCH), which may include an Enhanced Dedicated Physical Control Channel (E-DPCCH) for data control and an Enhanced Dedicated Physical Data Channel (E-DPDCH) for data. The E-DPCCH and the E-DPDCH may be discontinuous and may be transmitted only when there is uplink data to be sent. Additionally, uplink data may be transmitted on a continuous Dedicated Physical Data Channel (DPDCH). A radio base station (RBS) may include an uplink scheduler that determines which transport formats each subscriber may use over the E-DPDCH.

As previously mentioned, the RNC may be responsible for admission control and congestion control. For example, the RNC may monitor and control the load in the RBS. The RNC may perform these operations based on Iub interface measurements from the RBS. The Iub measurements related to the uplink may include received total wideband power (RTWP) (i.e., the total received power at the uplink receiver), reference received total wideband power (RRTWP) (i.e., the thermal noise contribution to the RTWP), and received scheduled E-DCH power share (RSEPS) (i.e., the received power from resources controlled by an enhanced uplink (EUL) scheduler (e.g., the E-DPCCH and the E-DPDCH) relative to the RTWP). In one implementation, the Iub measurements may be transmitted to the RNC by the RBS in a Node B Application Part (NBAP) report. In some instances, the NBAP report may include both the RSEPS and the RTWP for the same time interval to enable direct comparisons.

FIG. 1 illustrates an exemplary uplink stack 100 that includes exemplary uplink interference contributions. As illustrated in FIG. 1, total uplink interference (I-total) 140 may include background noise interference 105, other-cell interference 110, DPDCH interference 115, DPCCH interference 120, non-scheduled interference 125 and scheduled interference 130. Non-scheduled interference 125 may include interference from the E-DPCCH, the E-DPDCH, and a High Speed Dedicated Physical Control Channel (HS-DPCCH). The HS-DPCCH may be employed for uplink acknowledgements relating to downlink data transmitted over a High Speed Downlink Shared Channel (HS-DSCH). Scheduled interference 130 may include interference from the E-DPCCH and the E-DPDCH. The interference contribution of scheduled interference is further illustrated by uplink scheduled interference (I_sch) 135.

Based on measurements over the Iub interface, the following may be estimated according to the following expressions:

Uplink noise rise as $\Lambda = RTWP/RRTWP$;

Uplink relative load as $L_{nr} = 1-(1/\Lambda) = 1-(RRTWP/RTWP)$; and

Non-scheduled load as $L_{non\text{-}sched} = L_{nr} - RSEPS$.

In such an instance, the non-scheduled load estimate may include the load due to inter-cell interference from other cells. Additionally, E-DCH may yield a non-scheduled load because the DPCCH of the E-DCH may be considered non-scheduled.

When balancing scheduled and non-scheduled loads, the non-scheduled load may be used as input to the admission control of the RNC to ensure that there is sufficient headroom for scheduled data. This reallocatable resource intended for scheduled E-DCH is referred to as the scheduling headroom. This may be expressed as:

$$L_{sched,\,headroom} = L_{nr,\,max} - L_{non\text{-}sched},$$

where $L_{nr,\,max}$ is the maximum uplink relative load of the cell based on, for example, a coverage or power control stability metric.

For a target scheduling headroom, a target non-scheduled load, $L_{non\text{-}sched,\,target}$ of the cell may be derived, to which an estimated current, non-scheduled load may be compared. In such a comparison, an admitted load, $L_{adm}$, from recently admitted connections that are still inactive may be included. Consequently, a user may be admitted if the following expression is met:

$$L_{non\text{-}sched} + L_{adm} + L_{new\,potential\,connection} \leq L_{non\text{-}sched,\,target}.$$

Margins considered by, for example, a load estimation algorithm (LEA) and/or a scheduler may affect the available scheduling headroom. For example, the RNC may employ a LEA for purposes of admission and/or congestion control. Additionally, or alternatively, the RBS may employ a LEA for scheduling, and/or assign grants to subscribers based on the scheduler. The LEA may calculate the load contribution from non-scheduled connections in their own cell, $L_{non\text{-}sched,\,own}$, and may maintain an estimate of other-cell load contribution, $L_{other}$ (i.e., the other-cell received power share). For example, the other-cell load contribution may equate to a ratio between received powers from other cells and the RTWP. In this regard, the scheduler may consider the scheduling headroom according to the following expression:

$$L_{sched,\,headroom} = L_{nr,\,max} - L_{non\text{-}sched,\,own} - L_{other}.$$

Further, in order to maintain a margin for inter-cell interference, and to be robust to estimation errors of the other-cell load contribution, the other-cell load contribution may be limited from below by a minimum other-cell load contribution $L_{other\,min}$. In one implementation, $L_{other\,min}$ may be a static value. Thus, the scheduler may consider the scheduling headroom according to the following expression:

$$L_{sched,\,headroom} = L_{nr,\,max} - L_{non\text{-}sched,\,own} - \max(L_{other},\,L_{other\,min}).$$

Such a margin, which is not always active, may not be accounted for in the Iub measurements. Additionally, there may be other margins utilized by the LEA and/or the scheduler that may not be accounted for in the Iub measurements, but reduce the scheduling headroom considered by the RBS.

Consequently, such margins may not be known by the RNC and correspondingly may not be taken into account.

Additionally, multi-user detector schemes and/or interference cancellation schemes may be adopted by the RBS to cancel intra-cell interference. One approach to such schemes includes regenerating the interfering signal from detected connections and subtracting the regenerated interfering signal from the received signal. Thus, the effective interference power from an E-DCH may be less than the actual received power. Therefore, the RSEPS may not reflect the actual balance between the E-DCH and a DCH.

SUMMARY

It is an object to obviate at least some of the above disadvantages and to improve the operation of a network.

According to one aspect, a method may include determining whether a discrepancy exists between scheduling headroom computable by a first device and scheduling headroom computable by a second device, determining one or more load measurements that the second device bases its computation of the scheduling headroom if it is determined that the discrepancy exists, modifying the one or more load measurements, and calculating the scheduling headroom based on the modified one or more load measurements.

Additionally, the modifying may include modifying, by the first device, the one or more load measurements, and the method may further include transmitting, by the first device, the modified one or more load measurements to the second device.

Additionally, the method may further include transmitting, by the first device, the one or more load measurements together with additional information about the scheduling headroom discrepancy to the second device, and where the modifying may include modifying, by the second device, the one or more load measurements based on the additional information about the scheduling headroom discrepancy.

Additionally, the method may include determining effective interference cancellation associated with enhanced dedicated channels, where the effective interference cancellation associated with the enhanced dedicated channels corresponds to the additional information.

Additionally, the determining the effective interference cancellation associated with the enhanced dedicated channels may include determining an interference from the scheduled enhanced dedicated channels before an interference cancellation process is employed, determining an interference from the scheduled enhanced dedicated channels after an interference cancellation process is employed, and determining the effective interference cancellation associated with the enhanced dedicated channels based on a difference between the interference determined before the interference cancellation process and the interference determined after the interference cancellation process.

Additionally, the determining may include calculating an other-cell load.

Additionally, the calculating may include determining whether a difference value between the other-cell load and a minimum other-cell load yields a non-zero value.

Additionally, the modifying may include modifying the one or more load measurements relating to an Iub interface if the difference value yields the non-zero value.

Additionally, the method may include performing, by the first device, interference cancellation, and determining an effective interference corresponding to an interference power that remains.

Additionally, the modifying may include modifying the one or more load measurements corresponding to a received scheduled enhanced dedicated channel power share (RSEPS) based on the effective interference associated with a received scheduled power and a received non-scheduled power.

Additionally, the method may include transmitting, by the first device, a modified received total wideband power (RTWP) measurement and a modified RSEPS measurement to the second device.

Additionally, the method may further include calculating, by the second device, at least one of admission control or congestion control parameters based on at least one of the modified RTWP measurement or the modified RSEPS measurement According to another aspect, a device may include a memory to store instructions, and a processor to execute the instructions. The processor may execute instructions to determine whether a discrepancy relating to scheduling headroom exists between the device and another device, modify a power measurement associated with an interface shared between the device and the other device if it is determined that the discrepancy exists, and provide the other device with a modified power measurement.

Additionally, when determining whether the discrepancy relating to scheduling headroom exists, the processor may be configured to calculate an other-cell load based on inter-cell interference.

Additionally, when calculating the other-cell load, the processor may be configured to determine whether a minimum other-cell load exceeds the other-cell load.

Additionally, when modifying the power measurement, the processor may be configured to compute at least one of a modified RTWP measurement, a modified reference received total wideband power (RRTWP) measurement, or a modified RSEPS measurement if it is determined that the discrepancy exists.

Additionally, the interface may include an Iub interface.

Additionally, when computing the processor may be configured to compute the at least one of the modified RTWP measurement or the modified RSEPS measurement based on a difference value, the difference value being equal to a difference between a minimum other-cell load and an other-cell load.

Additionally, the processor may further execute instructions to determine an effective interference after interference cancellation is performed.

Additionally, when modifying the power measurement, the processor may be configured to compute at least one of a modified RTWP measurement or a modified RSEPS measurement based on the effective interference.

Additionally, when providing the other device with the modified power measurement, the processor may be configured to provide the modified RTWP measurement and the modified RSEPS measurement to the other device, and provide an unmodified RTWP measurement to the other device.

Additionally, when determining the effective interference, the processor may be configured to determine connections subject to interference cancellation and connections not subject to interference cancellation.

Additionally, the device may include a radio base station and the other device may include a radio network controller.

According to still another aspect, a computer-readable medium may include instructions executable by a radio base station, the computer-readable medium may include one or more instructions for determining whether a discrepancy relating to a non-scheduling load exists between the radio base station and a radio network controller, one or more instructions for modifying one or more interface measurements if the non-scheduling load discrepancy exists, and one or more instructions for sending a modified one or more interface measurements to the radio base station controller.

Additionally, the one or more instructions for determining may include one or more instructions for calculating whether a minimum other-cell load value exceeds an other-cell load value.

Additionally, the one or more instructions for calculating may include one or more instructions for generating a difference value, the difference value being a quantity by which the minimum other-cell load value exceeds the other-cell load value.

Additionally, the one or more interface measurements may include a RSEPS measurement, and the one or more instructions for modifying may include one or more instructions for subtracting the difference value from the RSEPS measurement.

Additionally, the one or more instructions for modifying may include one or more instructions for modifying the one or more interface measurements based on the difference value.

Additionally, the one or more interface measurements include at least one of a RTWP measurement, a RRTWP measurement, or a RSEPS measurement.

Additionally, the one or more interface measurements may relate to an Iub interface.

Additionally, the computer-readable medium may further include one or more instructions for determining an interference power after an interference cancellation scheme is performed.

Additionally, the computer-readable medium may further include one or more instructions for calculating one or more modified interface measurements based on the interference power.

Additionally, the modified one or more interface measurements based on the interference power may include a modified RTWP measurement.

Additionally, the modified one or more interface measurements based on the interference power may include a modified RSEPS measurement.

According to still another aspect, a device may include a memory to store instructions, and a processor to execute the instructions. The processor may execute instructions to receive one or more load measurements and effective cancellation interference information associated with a scheduling headroom discrepancy determination, modify the one or more load measurements based on the effective cancellation interference information, and calculate a scheduling headroom based on the modified one or more load measurements.

Additionally, the effective interference information may correspond to effective cancellation interference information associated with scheduled enhanced dedicated channels.

Additionally, when calculating the scheduled headroom, the processor may be further configured to calculate a received scheduled enhanced dedicated channel power (RSEP) based on the one or more load measurements, where the one or more load measurements include a received total wideband power (RTWP) measurement and a received scheduled enhanced dedicated channel power share (RSEPS) measurement, calculate a total cancelled interference, modify the RSEP and the RTWP based on the calculation of the total cancelled interference, and modify the RSEPS based on the modified RSEP and the modified RTWP.

DETAILED DESCRIPTION

The following detailed description refers to the accompanying drawings. The same reference numbers in different drawings may identify the same or similar elements. Also, the following description does not limit the invention. The term "component," as used herein, is intended to be broadly interpreted to include software, hardware, or a combination of hardware and software.

Figure 2:
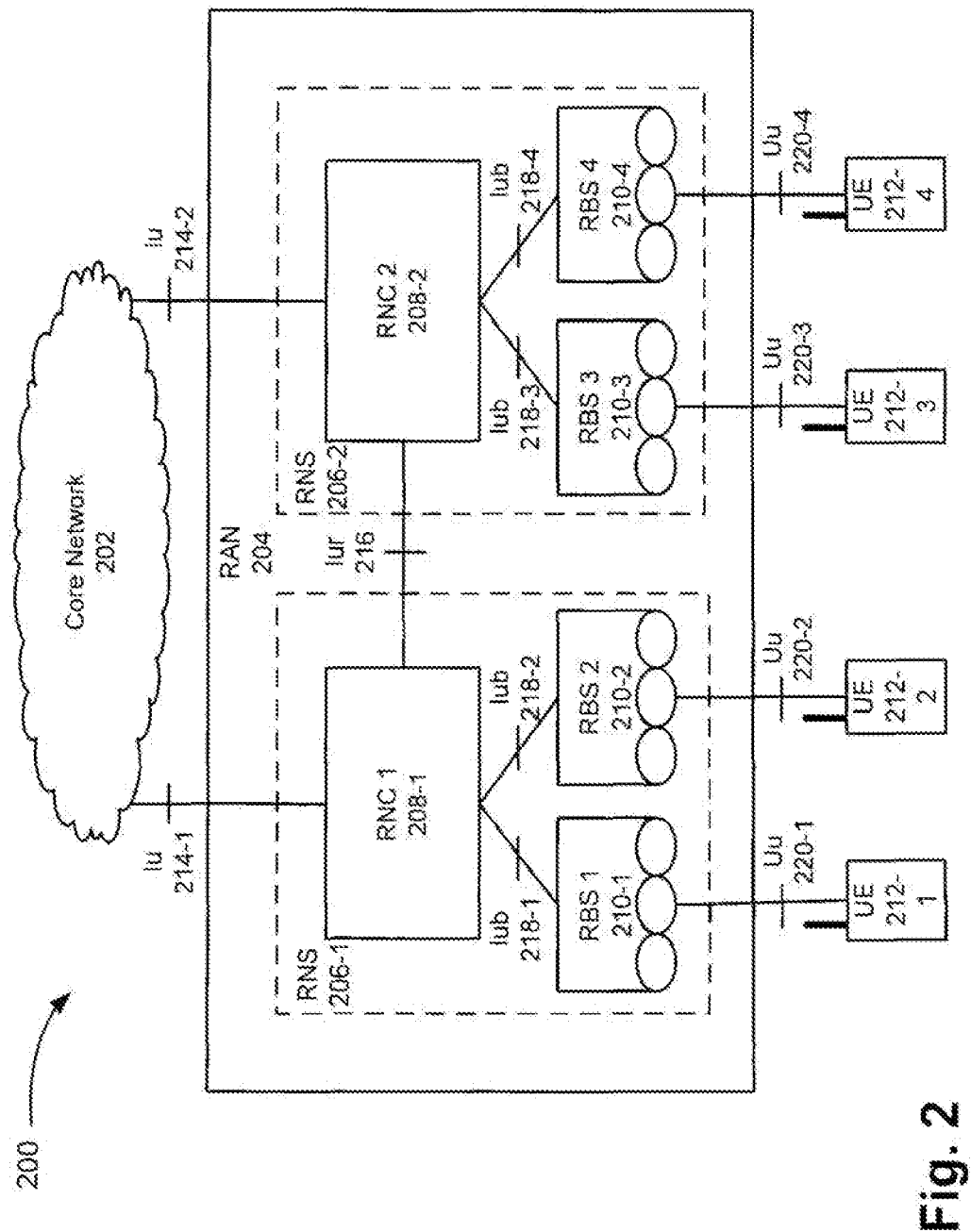
FIG. 2 is a diagram illustrating an exemplary wireless network environment.

FIG. 2 illustrates an exemplary wireless network 200. As illustrated, wireless network 200 may include a core network (CN) 202, a radio access network (RAN) 204, radio network subsystems 206-1 and 206-2 (collectively referred to as RNS 206), radio network controllers (RNCs) 208-1 and 208-2 (collectively referred to as RNC 208), radio base stations (RBSs) 210-1, 210-2, 210-3, and 210-4 (collectively referred to as RBS 210), user equipment (UE) 212-1, 212-2, 212-3, and 212-4 (collectively referred to as UE 212), Iu interfaces 214-1 and 214-2 (collectively referred to as Iu interface 214), Iub interfaces 218-1, 218-2, 218-3, and 218-4 (collectively referred to as Iub interface 218), and Uu interfaces 220-1, 220-2, 220-3, and 220-4 (collectively referred to as Uu interface 220). In one implementation, wireless network 200 may correspond to a wideband code division multiple access (WCDMA)-based network. In other implementations, wireless network 200 may correspond to a network other than a WCDMA-based network.

CN 202 may be, for example, a network that includes circuit switched and packet switched domains that provide various services to UE 212 subscribers. For example, although not illustrated, the circuit switched domain may include mobile switching centers (MSCs), visitor location registers (VLRs), and gateways. The packet switched domains may include, for example, serving general packet radio service (GPRS) support nodes (SGSN) and gateway GPRS support nodes (GGSNs). CN 202 may also include home location registers (HLRs), authentication centers (AUCs), equipment identity registers (EIR), etc.

RAN 204 may be a part of wireless network 200 that is responsible for the radio transmission and control of a radio connection between UE 212 and CN 202. In one embodiment, RAN 204 may include one or more RNSs 206. RNS 206 may manage resource allocations of a radio link to a subscriber. Each RNS 206 may include an RNC 208 and a group of RBSs 210.

RNC 208 may control radio resource management and radio connectivity within a set of cells. For example, RNC 208 may manage radio access bearers for user data transfer (e.g., between CN 202 and UE 212), manage and optimize radio network resources (e.g., outer-loop power control and admission and congestion control), and/or control mobility, including soft handovers. RNC 208 may determine load information for purposes of admission and congestion control, as further described below.

RNC 208 may control RBS 210 via Iub interface 218. RNC 208 may also connect RAN 204 to CN 202 via Iu interface 214. RNC 208 may include a controlling RNC and a serving RNC. For example, RNC 208-1 may be the controlling RNC, and RNC 208-2 may be the serving RNC. The controlling RNC may have overall control of a particular set of cells and their associated RBS 210. In instances, for example, when UE 212 may need to utilize resources in a cell not controlled by its serving RNC, the serving RNC (e.g., RNC 208-2) may issue a request to the controlling RNC (e.g., RNC 208-1) for such resources via Iur interface 216.

RBS 210 (sometimes referred to as Node B) may handle radio transmission and reception within one or more cells. Each cell may be identified by a unique identifier, which may be broadcast in the cell. In some instances, there may be more than one cell covering the same geographical area. RBS 210 may perform various functions, such as calculations of timing advance, measurements in the uplink direction, scheduling headroom, channel coding, encryption, decryption, frequency hopping, inner-loop power control, softer handover combining and splitting, and operation and maintenance.

UE 212 may include a mobile terminal by which subscribers may access services by maintaining a radio link with one or more cells in RAN 204. UE 212 may include a mobile phone, a personal digital assistant (PDA), a mobile computer, a laptop, and/or another type of handset or communication device. In other instances, UE 212 may include a vehicle-mounted terminal.

Figure 1:
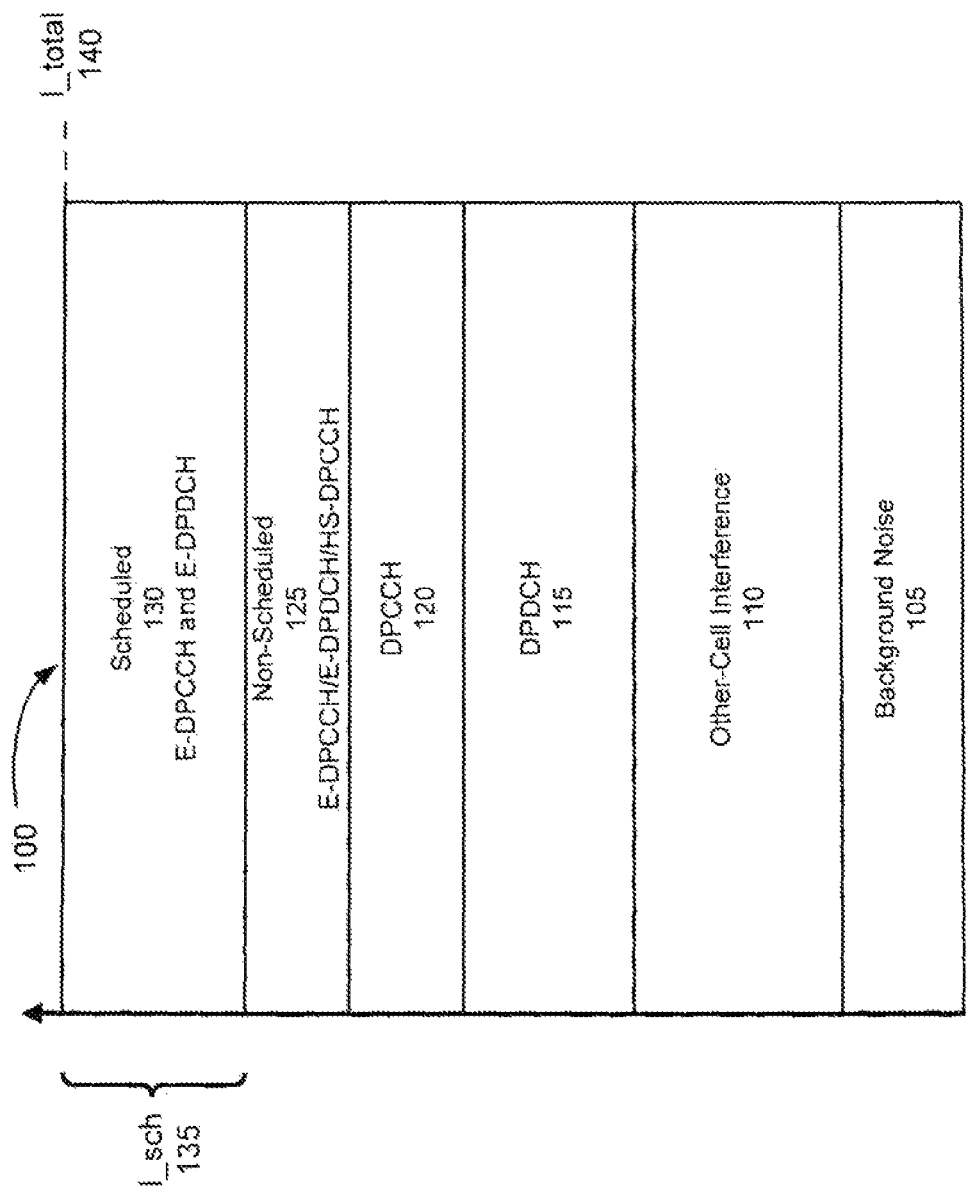
FIG. 1. is a diagram illustrating exemplary uplink interference contributions.

Iu interface 214 may connect CN 202 with RAN 204. Iur interface 216 and Iub interface 218 may connect the different nodes in RAN 204, as illustrated in FIG. 1. Uu interface 220 may connect UE 212 to RBS 144. User data may be transported on transport bearers on these interfaces. Depending on the transport network employed, the transport bearers may be mapped to, for example, Asynchronous Transfer Mode (ATM) adaptation layer type 2 (AAL2) connections for an ATM based transport network, or User Datagram Protocol (UDP) connections for an Internet Protocol (IP) based transport network.

Although FIG. 1 illustrates an exemplary wireless network 200, in other implementations, fewer, additional, or different devices may be employed. Additionally, or alternatively, one or more devices of wireless network 200 may perform one or more functions described as being performed by one or more other devices of wireless network 200.

Figure 3:
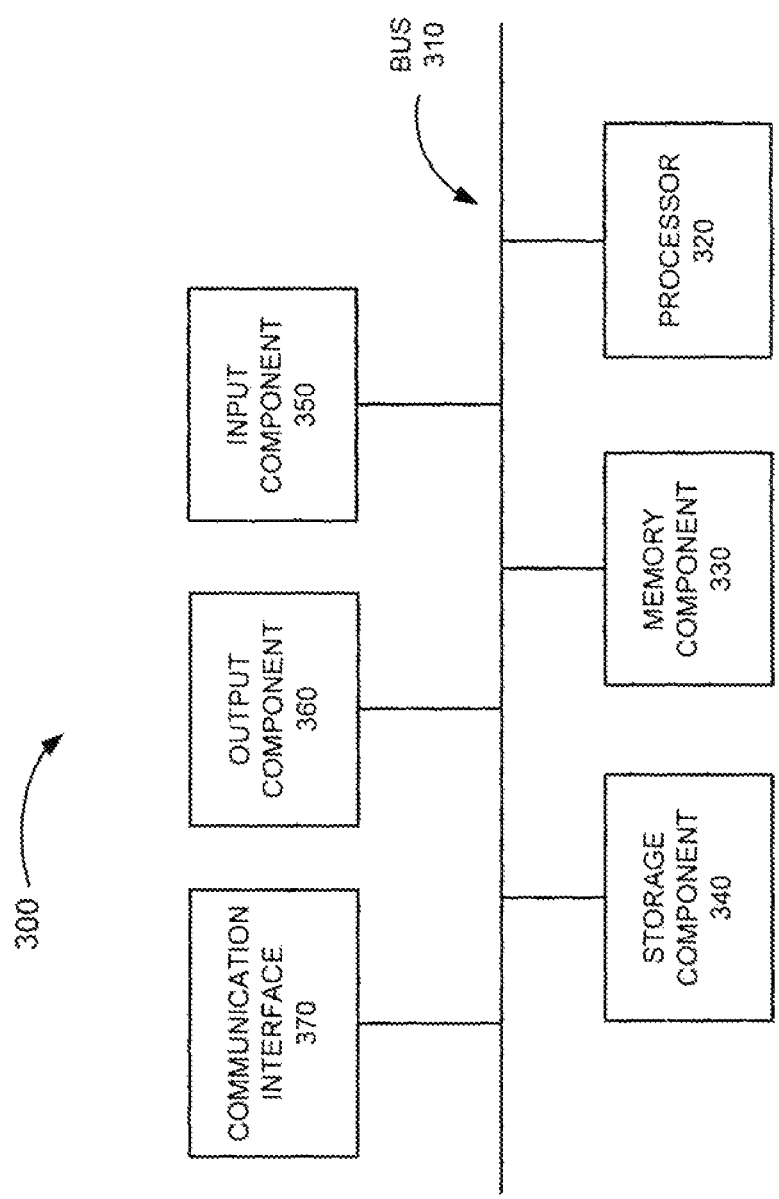
FIG. 3 is a diagram illustrating exemplary components that may correspond to one or more of the devices of the exemplary wireless network environment depicted in FIG. 2.

FIG. 3 is a diagram illustrating exemplary components of a device 300 that may correspond to one or more of the devices depicted in FIG. 1. For example, device 300 may correspond to RNC 208, RBS 210, and/or UE 212. As illustrated, device 300 may include a bus 310, a processor 320, a memory component 330, a storage component 340, an input component 350, an output component 360, and/or a communication interface 370.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or any other component or group of components that may interpret and execute instructions.

Memory component 330 may include any type of component that stores data and instructions related to the operation and use of device 300. For example, memory component 330 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage component 340 may include a storing component, such as a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive.

Memory component 330 and/or storage component 340 may also include a storing component external to and/or removable from device 300, such as a Universal Serial Bus (USB) memory stick, a hard disk, a Subscriber Identity Module (SIM), etc.

Input component 350 may include a mechanism that permits a user to input information to device 300, such as a keyboard, a keypad, a mouse, a button, a switch, voice recognition, etc. Output component 360 may include a mechanism that outputs information to a user, such as a display, a speaker, one or more light emitting diodes (LEDs), etc.

Communication interface 370 may include any transceiver-like mechanism that enables device 300 to communicate with other devices and/or systems. For example, communication interface 370 may include an Ethernet interface, an optical interface, a coaxial interface, a radio interface, or the like. Communication interface 330 may allow for wired and/or wireless communication.

Communication interface 330 may implement industry promulgated protocol standards, such as transmission control protocol/Internet protocol (TCP/IP), Asynchronous Transport Mode (ATM), digital subscriber line (DSL), integrated services digital network (ISDN), fiber channel, synchronous optical network (SONET), Ethernet, Institute of Electrical and Electronic Engineers (IEEE) 802 standards, etc. Additionally, or alternatively, communication interface 330 may implement non-standard, proprietary, and/or customized interface protocols. Communication interface 330 may contain a plurality of communication interfaces to handle multiple traffic flows.

As will be described in detail below, device 300 may perform certain operations relating to the system and services described herein. Device 300 may perform these operations in response to processor 320 executing software instructions contained in a computer-readable medium, such as memory component 330. A computer-readable medium may be defined as a physical or a logical memory device.

The software instructions may be read into memory component 330 from another computer-readable medium or from another device via communication interface 370. The software instructions contained in memory component 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

Figure 4:
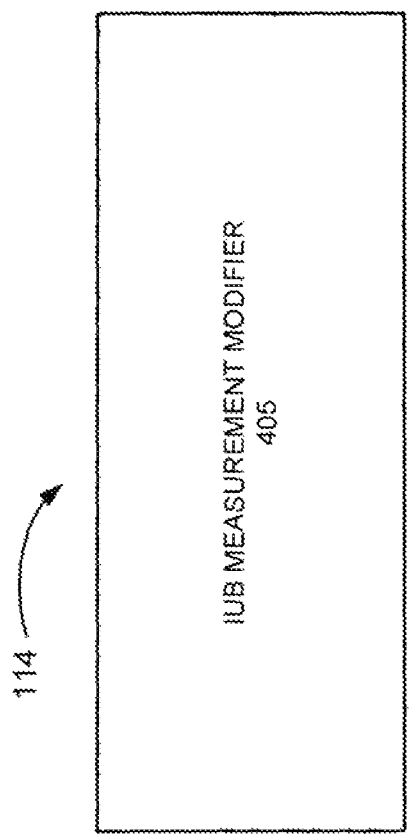
FIG. 4 is a diagram illustrating an exemplary component associated with the RBS depicted in FIG. 2.

FIG. 4 is a diagram of an exemplary component of RBS 210 that may perform calculations for modifying Iub 218 measurements. For purposes of discussion, the component will be referred to as an Iub measurement modifier 405. Iub measurement modifier 405 may modify Iub 218 measurement values, such as the RTWP, the RRTWP, and/or the RSEPS, according to the expressions provided below. In one implementation, Iub measurement modifier 405 may implemented as software stored in storage component 340. In another implementation, Iub measurement modifier 405 may be implemented as hardware, such as processor 320. In still other implementations, Iub measurement modifier 405 may include a combination of hardware and software.

Although FIG. 4 illustrates an exemplary component of RBS 210, in other implementations, Iub measurement modifier 405 may be a component of a device other than RBS 210. Additionally, or alternatively, the functionality associated with Iub measurement modifier 405, as to be described more fully below, may be employed in a distributed fashion between or among more than one device, including or excluding RBS 210.

Figure 5:
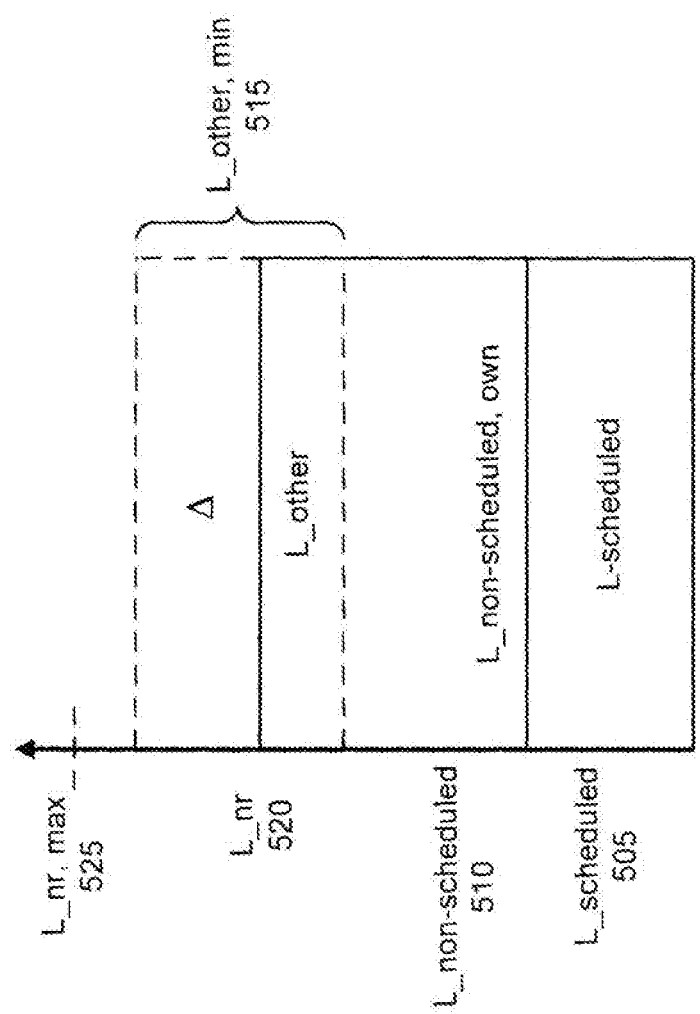
FIG. 5 is a diagram illustrating relations between defined load quantities.

FIG. 5 is a diagram illustrating exemplary load contributions. As illustrated, load information may include a L_scheduled portion 505 (i.e., a scheduled load), a L_non-scheduled portion 510 that may include a L_non-scheduled load, own, and an other-cell load (L_other), and a L_other, min 515 that may include a load corresponding to $\Delta$, as described below. Further, FIG. 5 illustrates a L_nr 520 and a L_nr, max 525 that correspond to a relative load and a maximum relative load, respectively.

Referring to FIG. 5, the non-scheduling load $L_{non\text{-}sched}$ may be separated into non-scheduled load from the own cell $L_{non\text{-}sched,\,own}$ and load from other-cells $L_{other}$ as discussed above. Thus, in one implementation, the scheduling headroom may be expressed as:

$$L_{sched,\,headroom} = L_{nr,\,max} - L_{non\text{-}sched,\,own} - \max(L_{other},\,L_{other\,min}) = L_{nr,\,max} - L_{non\text{-}sched,\,own} - L_{other} - \max(0, L_{other\,min} - L_{other}). \quad (1)$$

In some instances, the scheduling headroom considered in RBS 210 may be (artificially) reduced according to the following expression:

$$\Delta = \max(0, L_{other\,min} - L_{other}), \quad (2)$$

in order to be robust to the inter-cell interference contribution as described above. However, when $\Delta$ is greater than zero, there may be a discrepancy between the scheduling headroom calculated by RBS 210 and the scheduled headroom that can be estimated in RNC 208. That is, in instances where $L_{other\,min}$ is greater than $L_{other}$, $\Delta$ may have a value greater than zero. For example, as illustrated in FIG. 5, the value of L_other, min 515 may exceed L_other. Thus, as indicated in expression (2) above, $\Delta$ may have a value greater than zero.

Based on the load contribution illustrated in FIG. 5, the LEA of RNC 208 may need to consider the non-scheduled load according to the following expression:

$$L_{non\text{-}sched} = L_{non\text{-}sched,\,own} + L_{other} + \Delta. \quad (3)$$

Since, however, RNC 208 may compute the non-scheduled load according to the following expression:

$$L_{non\text{-}sched} = L_{nr} - RSEPS, \quad (4)$$

the impact or effect from a non-zero $\Delta$ may be accounted for by modifying either RSEPS or $L_{nr}$. That is, Iub measurement modifier 405 may modify either RSEPS or $L_{nr}$. As previously described above, $L_{nr}$ may be expressed as:

$$L_{nr} = 1 - (RRTWP/RTWP).$$

Thus, $L_{nr}$ may be computed from RRTWP and RTWP. Accordingly, the impact or effect from a non-zero $\Delta$ may be accounted for by modifying either of RSEPS, RTWP, or RRTWP.

Based on expressions (3) and (4), the RSEPS may be modified according to the following expression:

$$RSEPS\_mod = RSEPS - \Delta. \quad (5)$$

In this regard, increasing the used load margin by reducing the used scheduled load measurement may appear to be an illogical approach. However, the rationale to this approach is that this measurement may be used to compute the non-scheduled load, which is increased as a consequence.

Based on expressions (3) and (4), $(L_{nr}\_mod) = L_{nr} + \Delta$, thus $$1 - \frac{RRTWP\_mod}{RTWP} = 1 - \frac{RRTWP}{RTWP} + \Delta = 1 - \frac{RRTWP - \Delta \cdot RTWP}{RTWP}. \quad (6)$$

Hence, the RRTWP may be modified according to the following expression:

$$RRTWP\_mod = RRTWP - \Delta * RTWP. \quad (7)$$

As noted from expression (6) above, the RTWP may be modified according to the following expression:

$$\frac{RRTWP}{RTWP\_mod} = \quad (8)$$

$$\frac{RRTWP - \Delta \cdot RTWP}{RTWP} \Leftrightarrow RTWP\_mod = \frac{RTWP}{1 - \Delta \cdot RTWP/RRTWP}.$$

In one implementation, Iub 218 measurement of the RRTWP may be reported by RBS 210 infrequently to RNC 208 since the RRTWP may not change frequently. Additionally, or alternatively, the RRTWP measurement may be updated based on an event-trigger so that reporting occurs only when there is a change of the RRTWP.

On the other hand, measurement modifications to the RSEPS or the RTWP may be considered. For example, a modified RTWP may be reported in the same report as the modified RSEPS. Also, a non-modified RTWP may be reported in a separate message. In either instance, modifications to the Iub 218 measurements may be utilized and reported to RNC 208 so that RNC 208 may be informed about the margins affecting RBS 210 scheduling headroom.

Further, in instances when RBS 210 employs a multi-user detector or an interference cancellation receiver, the effective interference measurement may be modified. For example, the effective interference may be determined after detection, signal regeneration and subtraction has been carried out. RBS 210 may then determine the efficiency of the cancellation, and consider the effective interference in the calculations of the RTWP and the RSEPS. For example, RBS 210 may separate the received scheduled power $I_{sched}$ and non-scheduled power $I_{non\text{-}sched}$ into powers from connections subject to interference cancellation, $I_{sched}^{IC}$ and $I_{non\text{-}sched}^{IC}$, and not subject to cancellation, $I_{sched}^{notIC}$ and $I_{non\text{-}sched}^{notIC}$, according to the following expressions:

$$I_{sched} = I_{sched}^{IC} + I_{sched}^{notIC} \quad (9)$$

$$I_{non\text{-}sched} = I_{non\text{-}sched}^{IC} + I_{non\text{-}sched}^{notIC}. \quad (10)$$

Further, RBS 210 may define the effective interference from connections subject to interference cancellation as $I_{sched}^{ICeff}$ and $I_{non-sched}^{ICeff}$ respectively. That is, $I_{sched}^{ICeff}$ and $I_{non-sched}^{ICeff}$ may correspond to the interference power that remains after a last step of an interference cancellation scheme. In such an instance, the measured interference values may be adjusted according to the following expressions:

$$I\_mod_{sched} = I_{sched} + I_{sched}^{ICeff} - I_{sched}^{IC}. \quad (11)$$

$$I\_mod_{non-sched} = I_{non-sched} + I_{non-sched}^{ICeff} - I_{non-sched}^{IC}. \quad (12)$$

Hence, as noted from expressions (9), (10), (11), and (12) above, the RTWP may be modified according to the following expression:

$$RTWP\_mod = RTWP + I_{sched}^{ICeff} - I_{sched}^{IC} + I_{non-sched}^{ICeff} - I_{non-sched}^{IC}. \quad (13)$$

Further, as noted from expressions (9), (10), (11), (12), and (13) above, the RSEPS may be modified according to the following expression:

$$RSEPS\_mod = \left(I_{sched} + I_{sched}^{ICeff} - I_{sched}^{IC}\right)/RTWP\_mod \quad (14)$$
$$= \left(I_{sched}^{notIC} + I_{sched}^{ICeff}\right)/RTWP\_mod.$$

Again, it may be beneficial to use the combined RSEPS and RTWP measurement report to provide the modified measurements, while the dedicated RTWP measurement report may include the unmodified measurement since this may be of specific interest for coverage determination.

Alternatively, measurement modifications may be determined by RNC 208 based on additional information received over Iub 218 together with RTWP and/or RSEPS measurements. For example, the additional information may include cancelled scheduled E-DCH interference and cancelled non-scheduled E-DCH interference, which may be expressed according to the following expressions:

$$I_{sched,canc} = I_{sched}^{ICeff} - I_{sched}^{IC}. \quad (15)$$

$$I_{non-sched,canc} = I_{sched}^{ICeff} - I_{sched}^{IC}. \quad (16)$$

Then, RNC 208 may be able to modify RSEPS based on the following exemplary procedure. For example, RNC 208 may calculate the received scheduled E-DCH power (RSEP) using the RSEPS and RTWP measurements according to the following expression:

$$RSEP = RSEPS * RTWP. \quad (17)$$

RNC 208 may calculate cancelled interference in total according to the following expression:

$$I_{canc} = I_{sched,canc} + I_{non-sched,canc} \quad (18)$$

RNC 208 may modify RSEP and RTWP based on the information related to cancelled interference according to the following expressions:

$$RTWP\_mod = RTWP - I_{canc} \quad (19)$$

$$RSEP\_mod = RSEP - I_{sched,canc} \quad (20)$$

RNC 208 may calculate a modified RSEPS according to the following expression:

$$RSEPS\_mod = RSEP\_mod/RTWP\_mod \quad (21)$$

In another embodiment, interference cancellation may never be employed to connections other than scheduled E-DCH connections in which case only cancelled scheduled E-DCH interference may be reported. Similarly, the cancelled interference from connections other than scheduled E-DCH connections may be neglected and/or treated as being negligible.

Figure 6:
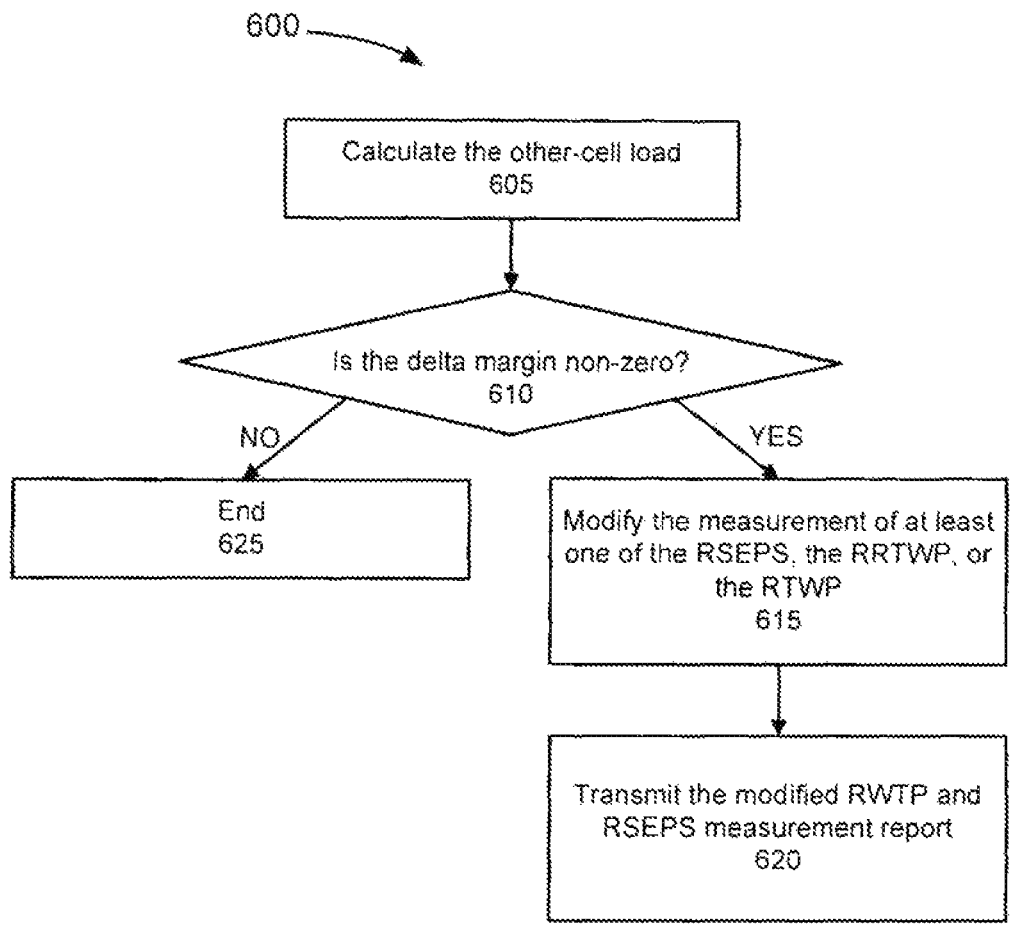
FIGS. 6, 7 and 8 are flow diagrams related to processes associated with the concepts described herein.

FIG. 6 is a diagram illustrating an exemplary process 600 that may be employed when calculating the scheduled headroom load. In one implementation, Iub measurement modifier 405 of RBS 210 may perform one or more of the operations of process 600. In other implementations, process 600 may be performed by another device or group of devices including or excluding RBS 210.

Process 600 may begin with calculating the other-cell load (block 605). As described in reference to expression (1), when calculating the scheduled headroom load, other-cell load may be considered. In some instances, RBS 210 may provide a margin for inter-cell interference corresponding to expression (2). For example, as indicated in expression (2), RBS 210 may calculate the other-cell load based on a delta margin.

A determination whether the delta margin is non-zero may be made (block 610). For example, based on expression (2), the delta margin may yield a zero or non-zero value, as illustrated in FIG. 5. If the delta margin is non-zero (block 610—YES), then the measurements of at least one of the RSEPS, RRTWP, or the RTWP may be modified (block 615). For example, the RSEPS measurement may be modified based on expression (5), the RRTWP measurement may be modified based on expressions (6) and (7), and the RTWP measurement may be modified based on expression (8).

The modified RWTP and the RSEPS measurement report may be transmitted (block 620). In one implementation, the modifications of the RWTP and the RSEPS measurements may be transmitted to, for example, RNC 208, in the same measurement report. In other implementations, the modified RRTWP may be transmitted to, for example, RNC 208, in a measurement report. Additionally, or alternatively, a non-modified RTWP measurement may be reported in the same or different message than the modified RTWP and RSEPS.

If the delta margin is zero (block 610—NO), then the process may end. For example, the scheduled headroom may be calculated without modifying measurements associated with Iub 218 measurements.

Although FIG. 6 illustrates an exemplary process 600, in other implementation, fewer, different, or additional operations may be performed.

Figure 7:
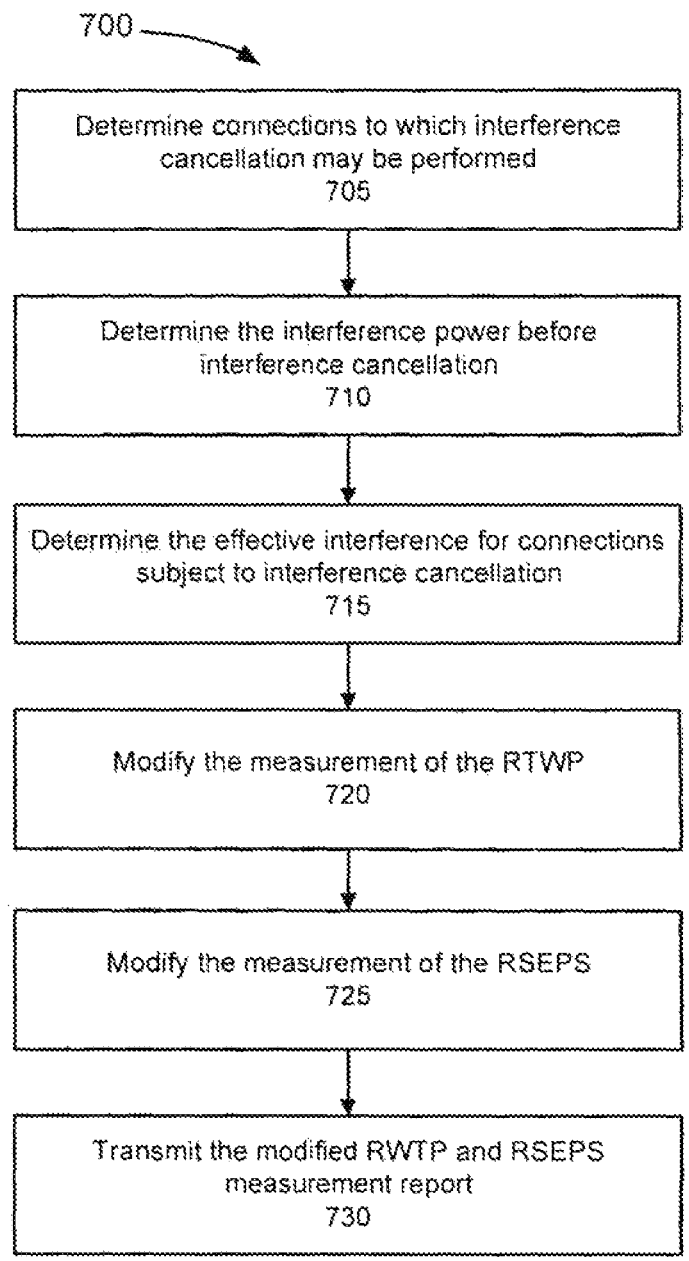

FIG. 7 is a diagram illustrating an exemplary process 700 that may be employed when calculating the effective interference. In one implementation, Iub measurement modifier 405 of RBS 210 may perform one or more of the operations of process 700. In other implementations, process 700 may be performed by another device or group of devices including or excluding RBS 210.

Process 700 may begin with determining connections to which interference cancellation may be performed (block 705). For example, as described in connection to expressions (9) and (10), flows may be separated into scheduled flows and non-scheduled flows. Additionally, flows may be separated into scheduled flows subject to interference cancellation and scheduled flows not subject to interference cancellation. Further, non-scheduled flows may be separated into non-scheduled flows subject to interference cancellation and non-scheduled flows not subject to interference cancellation.

The interference power before interference cancellation is performed may be determined (block 710). For example, in one implementation, received schedule power and non-scheduled power may each be determined before an interference scheme is employed based on power connections subject to interference cancellation and connections not subject to interference cancellation. In one implementation, the interference power may be determined based on expressions (9) and (10).

The effective interference for connections subject to interference cancellation may be determined (block 715). For example, RBS 210 may determine the effective interference for connections subject to interference cancellation after an interference cancellation scheme is employed. In one implementation, the measured effective interference may be based on expressions (11) and (12).

The measurement of the RTWP may be modified (block 720). For example, the RTWP may be modified based on expression (13).

The measurement of the RSEPS may be modified (block 725). For example, the RSEPS may be modified based on expression (14).

The modified RWTP and RSEPS measurement report may be transmitted (block 730). In one implementation, the modifications of the RWTP and the RSEPS may be transmitted to, for example, RNC 208, in the same measurement report. Additionally, or alternatively, a non-modified RTWP measurement may be reported in the same or different message than the modified RTWP and RSEPS.

Although FIG. 7 illustrates an exemplary process 700, in other implementation, fewer, different, or additional operations may be performed.

Figure 8:
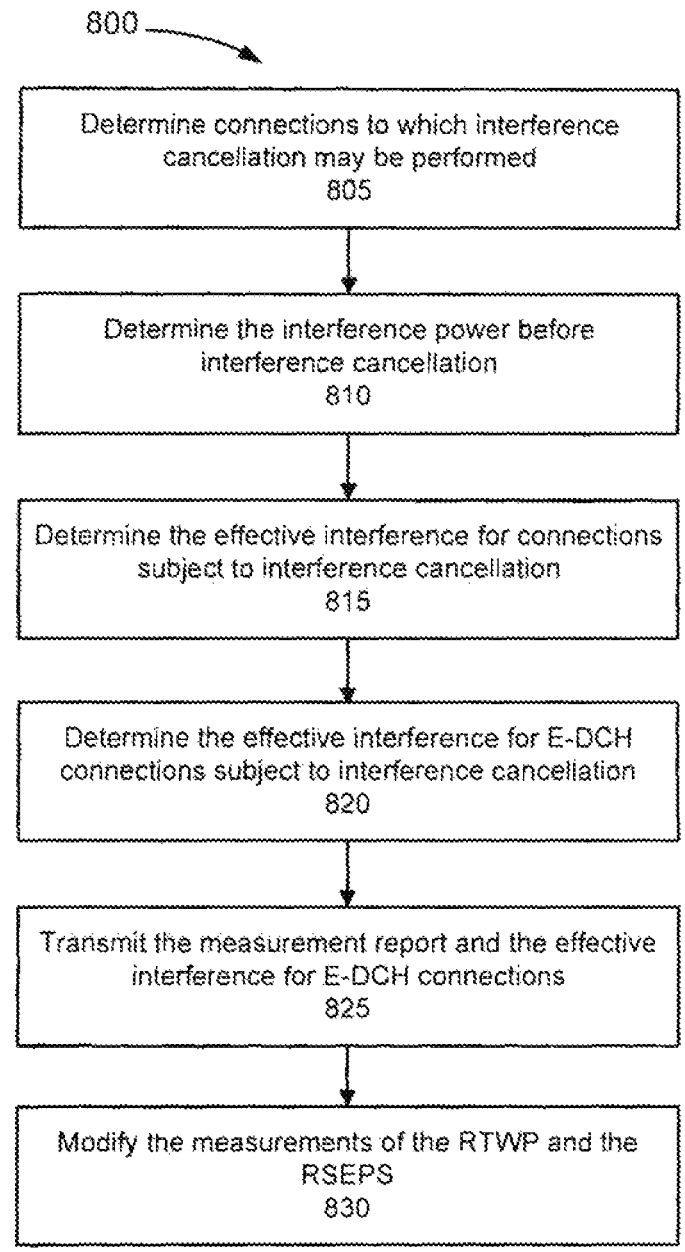

FIG. 8 is a diagram illustrating an exemplary process 800 that may be employed when calculating the effective interference.

Process 800 may begin determining connections to which interference cancellation may be performed (block 805). For example, as described in connection to expressions (9) and (10), flows may be separated into scheduled flows and non-scheduled flows. Additionally, flows may be separated into scheduled flows subject to interference cancellation and scheduled flows not subject to interference cancellation. Further, non-scheduled flows may be separated into non-scheduled flows subject to interference cancellation and non-scheduled flows not subject to interference cancellation.

The interference power before interference cancellation is performed may be determined (block 810). For example, in one implementation, received schedule power and non-scheduled power may each be determined before an interference scheme is employed based on power connections subject to interference cancellation and connections not subject to interference cancellation. In one implementation, the interference power may be determined based on expressions (9) and (10).

The effective interference for connections subject to interference cancellation may be determined (block 815). For example, RBS 210 may determine the effective interference for connections subject to interference cancellation after an interference cancellation scheme is employed. In one implementation, the measured effective interference may be based on expressions (11) and (12).

The effective interference for E-DCH connections subject to interference cancellation may be determined (block 820). For example, RBS 210 may determine the effective interference for connections subject to interference cancellation after an interference cancellation scheme is employed. In one implementation, the measured effective interference may be based on expressions (15) and (16).

A measurement report and the effective interference for E-DCH connections may be transmitted (block 825). For example, RBS 210 may transmit the measurement report and the effective interference associated with E-DCH connections to RNC 208.

Measurements of the RTWP and the RSEPS may be modified (block 830). For example, RNC 208 may modify the RTWP and the RSEPS measurements based on expressions (17), (18), (19), (20), and (21).

Although FIG. 8 illustrates an exemplary process 800, in other implementation, fewer, different, or additional operations may be performed. For example, as previously described above, in some instances, interference cancellation may not be employed to connections other than scheduled E-DCH connections. In such instances, process 800 may be modified to where only cancelled E-DCH interference may reported.

In contrast to other implementations where the scheduled headroom may be smaller than what is reflected by Iub 218 measurements (e.g., the RTWP, the RRTWP, and the RSEPS), the concepts described herein may provide that RNC 208 and RBS 210 have the same view of the scheduled headroom, as well as the effective interference (e.g., the actual balance between the E-DCH and the DCH). That is, given the margin information provided from, for example, the LEA, the scheduler, interference cancellation performance of the receiver, and/or knowledge about how RNC 208 calculates the non-scheduled load, RBS 210 may recognize discrepancies (in terms of view) and modify the Iub 218 measurements, as well as effective interference measurements so that RNC 208 and RBS 210 may have a corresponding network state view. As a result, a variety of advantages may be realized. For example, admission control decisions by RNC 208 may be more accurate based on the modified Iub 218 measurements, which may prevent a scenario where too many subscribers may be admitted. For example, in instances when there are too many subscribers admitted, a significant portion of the uplink resources may be utilized based on the continuous transmission over the DPCCH, which may lead to excessive non-scheduled load. Additionally, or alternatively, admission control by RNC 208 may provide for sufficient headroom for scheduled data since the estimation of the non-scheduled load may be more accurate. Additionally, or alternatively, congestion control of RNC 208 may be improved. Additionally, or alternatively, DCH Radio Resource Management (RRM) may be more efficiently managed.

Conclusion

The foregoing description of implementations provides illustration, but is not intended to be exhaustive or to limit the implementations to the precise form disclosed. Modifications and variations are possible in light of the above teachings or may be acquired from practice of the teachings. For example, the concepts described herein may be applied to any type of network where a functional split exists (e.g., a base station and a base station controller) so that discrepancies of one or more network states (e.g., headroom) between respective devices may be mitigated. More generally, even a single device or node that includes a functional split (e.g., a scheduling component and an admission component) may benefit from the concepts described herein.

In addition, while series of blocks have been described with regard to processes illustrated in FIG. 6 and FIG. 7, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method of providing interface measurements in a wireless communications network, the method being implemented by a radio base station and comprising:
   determining whether a discrepancy relating to a non-scheduling load exists between the radio base station and a radio network controller; and
   if the discrepancy exists:
      modifying one or more interface measurements for an interface between the radio base station and the radio network controller; and
      transmitting the one or more modified interface measurements to the radio network controller.

2. The method of claim 1 further comprising, if the discrepancy exists:
   determining and amount of cancelled scheduled Enhanced Dedicated Channel (E-DCH) interference, and an amount of cancelled non-scheduled E-DCH interference; and
   transmitting an indication of the determined amounts of cancelled interference to the radio network controller.

3. The method of claim 1 wherein the determining comprises:
   determining an other-cell based on inter-cell interference; and
   determining that the discrepancy exists if a minimum other-cell load exceeds the determined other-cell load.

4. The method of claim 3 wherein the modifying is performed based on a difference between the minimum other-cell load and the determined other-cell load.

5. The method of claim 4 wherein the modifying comprises subtracting the difference from a received scheduled Enhanced Dedicated Channel (E-DCH) power share (RSEPS).

6. The method of claim 1 further comprising, if the discrepancy exits:
   performing interference cancellation; and
   determining an effective interference correspondence to a remaining, non-cancelled interference power.

7. The method of claim 6:
   wherein the interference cancellation is performed on an Enhanced Dedicated Physical Control Channel (E-DPCCH) and an Enhanced Dedicated Physical Data Channel (E-DPDCH); and
   wherein the effective interference is determined based on the E-DPCCH and E-DPDCH.

8. The method of claim 6 wherein the modifying comprises modifying one or more load measurements corresponding to a received total wideband power (RTWP) based on an effective interference of a received scheduled power and a received non-scheduled power.

9. The method of claim 6 wherein the modifying comprises modifying one or more load measurements corresponding to a received scheduled Enhanced Dedicated Channel (E-DCH) power share (RSEPS) based on an effective interference of a received scheduled power and a received non-scheduled power.

10. The method of claim 1 wherein the transmitting comprises transmitting a modified received total wideband power (RTWP) measurement and a modified received scheduled Enhanced Dedicated Channel (E-DCH) power share (RSEPS) measurement to the radio network controller.

11. The method of claim 10 wherein the transmitting further comprises transmitting an unmodified RTWP measurement to the radio network controller.

12. The method of claim 1 wherein the one or more modified interface measurement include at least one of:
   a modified received total wideband power (RTWP);
   a modified reference received total wideband power (RRTWP); and
   a modified received scheduled Enhanced Dedicated Channel (E-DCH) power share (RSEPS).

13. The method of claim 1 further comprising calculating a scheduling headroom based on the one or more modified interface measurements.

14. The method of claim 1 wherein the interface between the radio base station and the radio network controller comprises an Iub interface.

15. A method of calculating scheduling headroom in a wireless communication network, the method being implemented by a radio network controller and comprising:
   receiving one or more interface measurements for an interface between a radio base station and the radio network controller;
   receiving effective cancellation interface information indicating an amount of interface cancellation performed by the radio base station on one or more scheduled enhanced dedicated channels;
   modifying the one or more load received measurements based on the effective cancellation interference information; and
   calculating a scheduling headroom for the radio base station based on the one or more modified load measurements.

16. The method of claim 15 wherein the effective cancellation interference information comprising an amount of interference cancellation performed by the radio base station for scheduled Enhanced Dedicated Channel (E-DCH) transmissions and for non-scheduled E-DCH transmissions.

17. The method of claim 15 wherein the one or more load measurements comprise a received total wideband power (RTWP) measurement and a received scheduled Enhanced Dedicated Channel (E-DCH) power share (RSEPS) measurement.

18. The method of claim 15 further comprising calculating at least one of admission control and congestion control parameters based on the one or more load measurements and effective cancellation interference information.

19. The method of claim 15 wherein the interface between the radio base station and the radio network controller comprises an Iub interface.

* * * * *

UNITED STATES PATENT AND TRADEMARK OFFICE
CERTIFICATE OF CORRECTION

| | | |
|---|---|---|
| PATENT NO. | : 8,442,548 B2 | Page 1 of 1 |
| APPLICATION NO. | : 13/488708 | |
| DATED | : May 14, 2013 | |
| INVENTOR(S) | : Englund et al. | |

It is certified that error appears in the above-identified patent and that said Letters Patent is hereby corrected as shown below:

In the Claims

In Column 15, Line 44, in Claim 2, delete "and" and insert -- an --, therefor.

In Column 15, Line 52, in Claim 3, delete "other-cell based" and insert -- other-cell load based --, therefor.

In Column 15, Line 64, in Claim 6, delete "exits:" and insert -- exists: --, therefor.

In Column 15, Line 66, in Claim 6, delete "correspondence" and insert -- corresponding --, therefor.

In Column 16, Line 28, in Claim 12, delete "measurement" and insert -- measurements --, therefor.

In Column 16, Line 39, in Claim 14, delete "lub" and insert -- Iub --, therefor.

In Column 16, Line 46, in Claim 15, delete "interface" and insert -- interference --, therefor.

In Column 16, Line 47, in Claim 15, delete "interface" and insert -- interference --, therefor.

In Column 16, Line 57, in Claim 16, delete "comprising" and insert -- comprises --, therefor.

In Column 17, Line 5, in Claim 19, delete "lub" and insert -- Iub --, therefor.

Signed and Sealed this
Twenty-second Day of April, 2014

Michelle K. Lee
*Deputy Director of the United States Patent and Trademark Office*